(12) United States Patent
Harada

(10) Patent No.: US 9,438,057 B2
(45) Date of Patent: Sep. 6, 2016

(54) DRIVE CONTROL DEVICE, DRIVE CONTROL METHOD AND DRIVE CONTROL PROGRAM

(71) Applicant: Panasonic Corporation, Osaka (JP)

(72) Inventor: Masaaki Harada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 14/368,414

(22) PCT Filed: Oct. 25, 2012

(86) PCT No.: PCT/JP2012/006860
§ 371 (c)(1),
(2) Date: Jun. 24, 2014

(87) PCT Pub. No.: WO2013/099079
PCT Pub. Date: Jul. 4, 2013

(65) Prior Publication Data
US 2014/0375273 A1 Dec. 25, 2014

(30) Foreign Application Priority Data
Dec. 28, 2011 (JP) .................................. 2011-287710

(51) Int. Cl.
*H02J 7/00* (2006.01)
*G06F 1/32* (2006.01)
*H04W 52/02* (2009.01)

(52) U.S. Cl.
CPC ........... *H02J 7/0063* (2013.01); *G06F 1/3212* (2013.01); *H02J 7/0047* (2013.01);
(Continued)

(58) Field of Classification Search
CPC ... H02J 7/0063; H02J 7/0047; G06F 1/3212; H04W 52/0261; H04W 52/0296

USPC ........................................................ 320/136
See application file for complete search history.

(56) References Cited

U.S. PATENT DOCUMENTS 6,201,372 B1 * 3/2001 Green, Jr. ............. H02J 7/0031
320/106
2002/0001381 A1 1/2002 Mori
(Continued)

FOREIGN PATENT DOCUMENTS

CN 1325250 A 12/2001
JP 05-189096 A 7/1993
(Continued)

OTHER PUBLICATIONS

English Translation of Search Report for Chinese Application No. 201280059643.2, Dated Nov. 3, 2015.
(Continued)

*Primary Examiner* — Vuthe Siek
(74) *Attorney, Agent, or Firm* — Pearne & Gordon LLP

(57) ABSTRACT

A drive control device that is capable of ensuring user convenience. The drive control device (100) is a device that controls the drive of an electronic device driven by means of the power of a battery, and comprises a battery information management section (280) and a battery state assessment section (300). Said battery information management section (280) manages the remaining power of a rechargeable battery, replaceable battery or other type of reserve battery for the electronic device, and/or whether a reserve battery exists. On the basis of the remaining power of the reserve battery and/or whether a reserve battery exists, said battery state assessment section (300) determines whether to drive the electronic device in a power-saving mode when the remaining power of a battery mounted in the electronic device has decreased to no more than a preset battery capacity.

9 Claims, 9 Drawing Sheets

(52) U.S. Cl.
CPC ..... *H04W52/0261* (2013.01); *H04W 52/0296* (2013.01); *H02J 2007/005* (2013.01); *H02J 2007/0067* (2013.01); *H04W 52/0277* (2013.01); *Y02B 60/1292* (2013.01); *Y02B 60/50* (2013.01)

(56) References Cited

U.S. PATENT DOCUMENTS

| | | | | |
|---|---|---|---|---|
| 2005/0268111 | A1* | 12/2005 | Markham | G06F 21/35 713/186 |
| 2008/0048876 | A1 | 2/2008 | Miyajima et al. | |
| 2008/0057894 | A1* | 3/2008 | Aleksic | H02J 9/002 455/187.1 |
| 2008/0313477 | A1 | 12/2008 | Numano | |

FOREIGN PATENT DOCUMENTS

| | | |
|---|---|---|
| JP | 2001-333161 A | 11/2001 |
| JP | 2008-034177 A | 2/2008 |
| JP | 2008-135920 A | 6/2008 |
| JP | 2011-056976 A | 3/2011 |

OTHER PUBLICATIONS

International Search Report for Application No. PCT/JP2012/006860 dated Nov. 27, 2012.

* cited by examiner

| RESERVE BATTERY FLAG | REMAINING BATTERY LEVEL | MEANING | PREFERRED DRIVING MODE |
|---|---|---|---|
| 0 | GREATER THAN THRESHOLD | ABSENCE OF RESERVE BATTERY AND HIGH REMAINING BATTERY LEVEL | NORMAL MODE |
| 1 | GREATER THAN THRESHOLD | PRESENCE OF RESERVE BATTERY AND HIGH REMAINING BATTERY LEVEL | NORMAL MODE |
| 0 | EQUAL TO OR LESS THAN THRESHOLD | ABSENCE OF RESERVE BATTERY AND LOW REMAINING BATTERY LEVEL | POWER SAVING MODE |
| 1 | EQUAL TO OR LESS THAN THRESHOLD | PRESENCE OF RESERVE BATTERY AND LOW REMAINING BATTERY LEVEL | NORMAL MODE |

FIG. 3

DRIVE CONTROL DEVICE, DRIVE CONTROL METHOD AND DRIVE CONTROL PROGRAM

TECHNICAL FIELD

The present invention relates to a drive control apparatus, a drive control method, and a drive control program that control the driving of an electronic device driven with the power of a battery.

BACKGROUND ART

In recent years, various electronic devices driven by the power of batteries, such as a smartphone, a tablet, and a portable game console (hereinafter, simply referred to as an "electronic device"), have been introduced. Related arts for controlling the driving of electronic devices includes an art that controls whether to drive an electronic device in a normal mode or a power saving mode (for example, see Patent Literature (hereinafter, referred to as PTL) 1).

In the art described in PTL 1, when the remaining power level of the battery of a mobile terminal becomes equal to or less than a predetermined level, the time required for moving to a place where the battery can be charged and/or replaced (hereinafter referred to as an "power supply location") is calculated, and the calculated time is compared with the drivable time in the normal mode. Then, the related art switches the driving mode of the mobile terminal from the normal mode to the power saving mode according to the result of comparison. That is, the related art determines whether additional power can be acquired when the remaining power level of the battery becomes equal to or less than the predetermined level. When determining that the additional power can be acquired, the related art determines to maintain the normal mode in the driving mode of the mobile terminal. On the other hand, when determining that the additional power cannot be acquired, the related art determines to switch the driving mode of the mobile terminal from the normal mode to the power saving mode. The power saving mode is a driving mode that allows the device to be driven while saving power compared with the normal mode although some of the functions available in the normal mode are not available in the power saving mode.

According to the related art, when the moving route and velocity are fixed, it is possible to strike a balance between maintaining the normal mode and maintaining the drivable time, which in turn, improves the convenience of users.

CITATION LIST

Patent Literature

PTL 1
Japanese Patent Application Laid-Open No. 2008-135920

SUMMARY OF INVENTION

Technical Problem

However, the moving route and velocity of a mobile terminal are rarely fixed. In fact, the related art may be unable to appropriately determine the necessity of switching to the power saving mode. That is, the related art may be unable to avoid running out of battery that could have been avoided by switching to the power saving mode sooner, or may unnecessarily restrict functions due to unnecessary switching to the power saving mode. That is, the related art has a problem in that it is difficult to secure the convenience of users.

It is an object of the present invention to provide a drive control apparatus, a drive control method, and a drive control program that can secure the convenience of users.

Solution to Problem

A drive control apparatus according to an aspect of the present invention is an apparatus that controls driving of an electronic device driven by power of a battery, the apparatus including: a battery information management section that manages at least one of a remaining power level of a reserve battery including a charging battery or a replacement battery for the electronic device, and the presence or absence of the reserve battery; and a battery state determination section that determines whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery.

A drive control method according to an aspect of the present invention is a method of controlling driving of an electronic device driven by power of a battery, the method including: managing at least one of a remaining power level of a reserve battery including a charging battery or a replacement battery for the electronic device, and the presence or absence of the reserve battery; and determining whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery.

A drive control program according to an aspect of the present invention is a program stored on a non-transitory computer readable medium that controls driving of an electronic device driven by power of a battery, the program causing a computer of the electronic device to execute processing including: managing at least one of a remaining power level of a reserve battery including a charging battery or a replacement battery for the electronic device, and the presence or absence of the reserve battery; and determining whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery.

ADVANTAGEOUS EFFECTS OF THE INVENTION

The present invention determines to switch to the power saving mode, taking into account a reserve battery, and can therefore improve the convenience of users.

BRIEF DESCRIPTION OF DRAWINGS

FIG. 3 is a drawing for explaining the meaning of flags in Embodiment 2 of the present invention;

DESCRIPTION OF EMBODIMENTS

Hereinafter, embodiments according to the present invention will be described in detail with reference to the accompanying drawings.

(Embodiment 1)

Embodiment 1 of the present invention is an example of a basic mode of the present invention.

Figure 1:
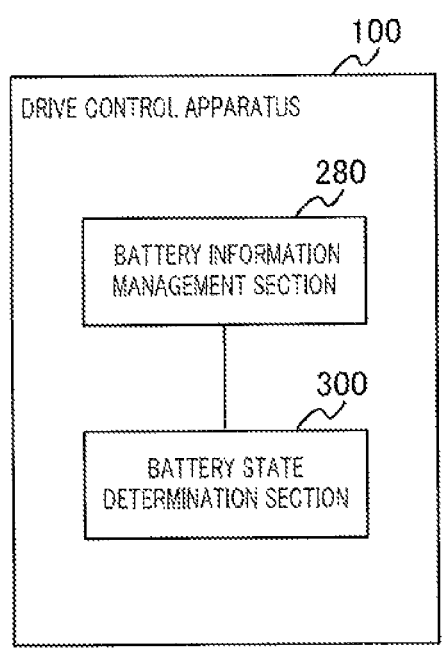
FIG. 1 is a block diagram illustrating the configuration of a drive control apparatus according to Embodiment 1 of the present invention.

FIG. 1 is a block diagram illustrating the configuration of a drive control apparatus according to the present embodiment.

In FIG. 1, drive control apparatus 100 is an apparatus that controls the driving of an electronic device driven by the power of a battery. Drive control apparatus 100 includes battery information management section 280 and battery state determination section 300.

Battery information management section 280 manages the remaining power level of a reserve battery including a battery used for charging (hereinafter, referred to as "charging battery") or a battery used for replacement (hereinafter, referred to as "replacement battery") for an electronic device, and/or the presence or absence of the reserve battery.

In this description, the term "remaining power level of a reserve battery" is based on a concept including both the remaining power level of a reserve battery that is obviously connectable to the electronic device immediately, and the remaining power level of a reserve battery that may not be connectable to the electronic device immediately.

In addition, the term "presence or absence of a reserve battery" is based on a concept including whether or not the user of the electronic device carries around a reserve battery with him or her, whether or not the user holds a reserve battery, and whether or not a reserve battery connectable to the electronic device immediately is present. Moreover, the term "presence or absence of a reserve battery" is based on a concept including whether or not it is likely that a reserve battery connectable to the electronic device immediately is present.

That is, the term "remaining power level of a reserve battery and/or the presence or absence of a reserve battery" is based on a concept including whether or not the power of a reserve battery can be used and whether or not it is likely that the power of a reserve battery is usable.

When the remaining power level of the battery loaded in the electronic device decreases to a level equal to or less than predetermined battery capacity, battery state determination section 300 determines whether to drive the electronic device in the power saving mode. Additionally, battery state determination section 300 determines whether to drive the electronic device in the power saving mode, on the basis of the remaining power level of the reserve battery and/or the presence or absence of the reserve battery, which are managed by battery information management section 280.

Drive control apparatus 100 includes, for example, a CPU (central processing unit), a storage media such as a ROM (read only memory) storing a control program, and a working memory such as a RAM (random access memory), which are not illustrated. In this case, the function of each component described above is implemented by the CPU executing the control program.

Drive control apparatus 100 as described above can switch whether to drive the electronic device in the power saving mode when the remaining power level of the battery decreases to a level equal to or less than the predetermined battery capacity. More specifically, drive control apparatus 100 can switch whether to drive the electronic device in the power saving mode according to the remaining power level of the reserve battery or the presence or absence of the reserve battery. Thereby, drive control apparatus 100 can maintain the normal mode when the power of the reserve battery can be used, and can switch to the power saving mode when the power of the reserve battery cannot be used. That is, even when the moving route or velocity of the electronic device is not fixed, drive control apparatus 100 can determine the necessity of appropriately switching to the power saving mode, and can improve the convenience of users.

Battery information management section 280 may also estimate whether the user holds the charged reserve battery. In this case, battery state determination section 300 determines whether to drive the electronic device in the power saving mode, on the basis of the above estimation result, when the remaining power level of the battery mounted in the electronic device decreases to a level equal to or less than the predetermined battery capacity. Drive control apparatus 100 can include a battery state linkage control section that controls the driving of the electronic device according to the result of determination of battery state determination section 300.

(Embodiment 2)

Embodiment 2 according to the present invention is an example in which the present invention is applied to an electronic device capable of acquiring position information, and is a specific example for performing the determination about an additional reserve battery. The electronic device is, for example, a smartphone.

The configuration of the electronic device including a driving apparatus according to the present embodiment will be described first.

Figure 2:
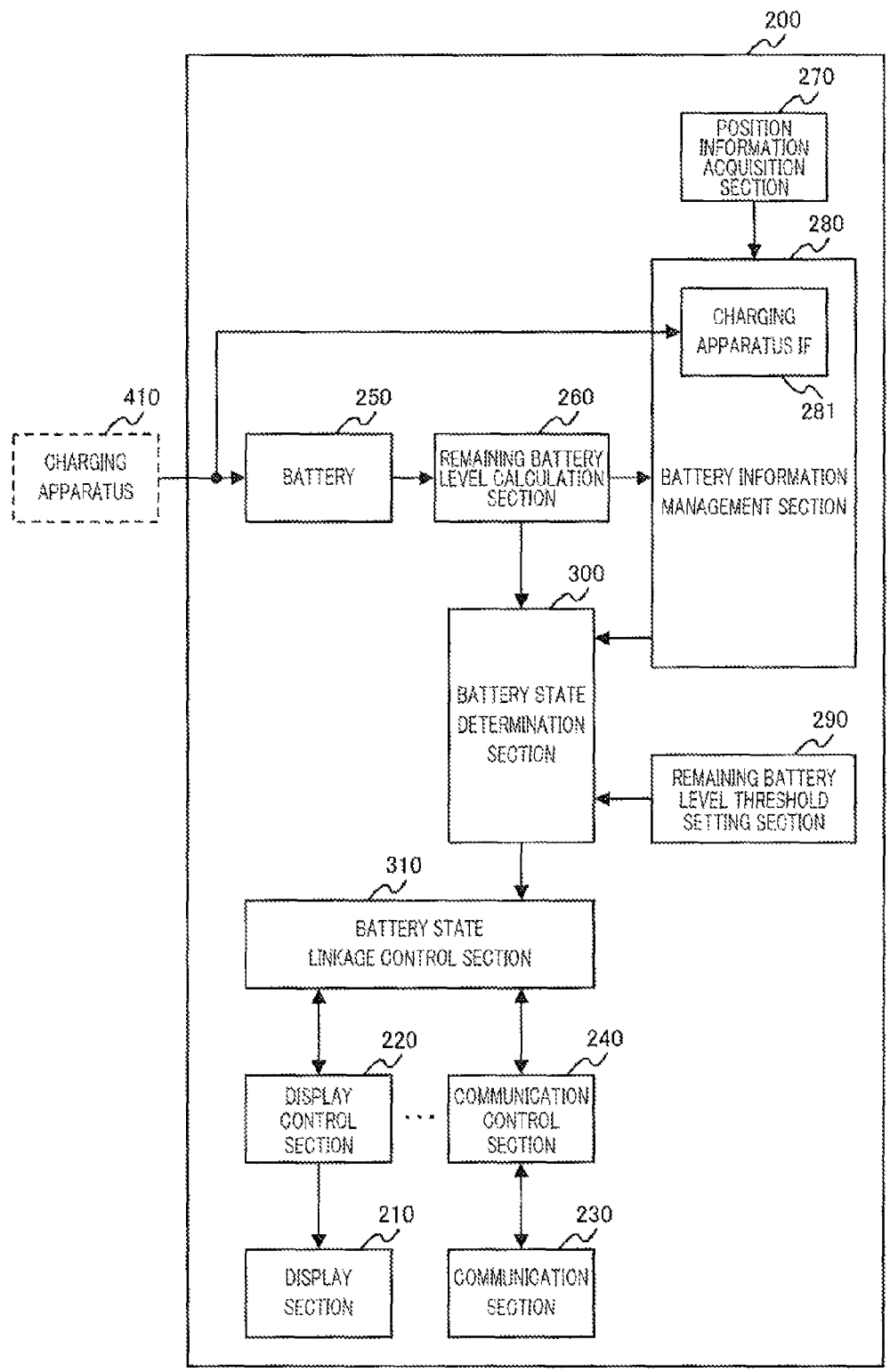
FIG. 2 is a block diagram illustrating the configuration of an electronic device including the drive control apparatus according to Embodiment 2 of the present invention.

FIG. 2 is a block diagram illustrating the configuration of the electronic device including the drive control apparatus according to the present embodiment.

In FIG. 2, electronic device 200 includes display section 210, display control section 220, communication section 230, communication control section 240, battery 250, remaining battery level calculation section 260, position information acquisition section 270, battery information management section 280, remaining battery level threshold setting section 290, battery state determination section 300, and battery state linkage control section 310.

Display section 210 is an apparatus section that displays an image, and is, for example, an LCD (Liquid Crystal Display).

Display control section 220 drives display section 210 by the power supplied from battery 250. Display control section 220 appropriately shifts the driving mode of display section 210 from the normal mode to the power saving mode in response to a control from battery state linkage control section 310 described below. Display control section 220 causes, for example, the brightness of display section 210 in the power saving mode to be lower than that in the normal mode. Display control section 220 also displays a message for prompting replacing of the battery or charging of the charging battery as a warning to the user about the remaining battery level, when a battery residue warning flag is "1."

Communication section 230 is an apparatus section that performs radio communication, and is a WiFi (Registered trademark) communication circuit, for example.

Communication control section 240 drives communication section 230 by the power supplied from battery 250. Communication control section 240 appropriately shifts the driving mode of communication section 230 from the normal mode to the power saving mode in response to a control from battery state linkage control section 310 described below. In the power saving mode, communication control section 240, for example, sets the transmission speed of communication control section 240 to be lower than that in the normal mode.

Battery 250 is a battery pack (battery) loaded in electronic device 200, stores power for driving electronic device 200, and supplies the stored power to electronic device 200. Battery 250 is generally loaded detachably from electronic device 200, and is replaceable with a replacement reserve battery (battery for replacement) (not illustrated), for example. Battery 250 is connectable to charging apparatus 410 from the outside of electronic device 200. Charging apparatus 410 is an additional reserve battery (battery for charging), and charges battery 250 when being connected to battery 250 (when being added). When battery 250 is not detachably loaded in electronic device 200, the replacement reserve battery is not used, but charging apparatus 410 is used.

Charging apparatus 410 is, for example, a primary or secondary battery such as a mobile charger, a battery charger, a mobile battery or a charging battery.

Battery 250 supplies power to components of electronic device 200 (including components not illustrated) including display control section 220 and communication control section 240. However, the drawings and description of the power supply system are omitted. The power saving mode is not limited to display control section 220 or communication control section 240, and is applied also to the power supply system, which is not illustrated.

Remaining battery level calculation section 260 immediately detects that the remaining power level (hereinafter referred to as "remaining battery level" as appropriate) of battery 250 decreases to a level equal to or less than predetermined battery capacity. More specifically, remaining battery level calculation section 260 detects the remaining battery level successively (for example, periodically, i.e., every unit time). Remaining battery level calculation section 260 then outputs the detection result to battery information management section 280 and battery state determination section 300.

Position information acquisition section 270 acquires information the position of electronic device 200 (hereinafter referred to as "position information") using, for example, GPS (Global Positioning System) or a radio network. Position information acquisition section 270 then outputs the acquired position information to battery information management section 280.

Battery information management section 280 estimates whether the user of electronic device 200 holds charged charging apparatus 410. Battery information management section 280 also estimates whether electronic device 200 is located outdoors, on the basis of the position information. Furthermore, battery information management section 280 estimates whether battery 250 is being charged on the basis of the detection result of remaining power level or the connection state to a charger through an interface, such as Micro USB.

Then, when estimating that electronic device 200 is located outdoors, battery information management section 280 determines that electronic device 200 cannot immediately be connected to a system power supply (for example, an AC power supply, not illustrated). Then, battery information management section 280 estimates that the user holds charged charging apparatus 410 under condition that battery 250 is charged even in a state where battery 250 cannot be charged from the system power supply. Then, when estimating that the user holds charged charging apparatus 410, battery information management section 280 reports the estimation to battery state determination section 300.

Battery information management section 280 includes charging apparatus interface (IF) 281. When charging apparatus 410 is connected to battery 250, charging apparatus interface 281 acquires information on the remaining amount of power stored in charging apparatus 410. This can simplify the process to find out the battery capacity of charging apparatus 410. Charging apparatus interface 281 is, for example, a Micro USB (Universal Serial Bus) interface utilized in a smartphone or the like. Battery information management section 280 successively reports information on the remaining amount of power stored in charging apparatus 410 as well to battery state determination section 300. Moreover, when charging apparatus 401 is connected, charging apparatus interface 281 may be configured to acquire information to distinguish whether connected charging apparatus 410 is charging apparatus 410 including a reserve battery or a system power supply. This can simplify estimation of whether the user holds charged charging apparatus 410.

Remaining battery level threshold setting section 290 stores a predetermined threshold concerning the remaining battery level. This threshold is a remaining battery level used as a timing reference to determine whether to shift the driving mode of electronic device 200 from the normal mode to the power saving mode.

When the remaining battery level decreases, battery state determination section 300 determines whether to drive electronic device 200 in the power saving mode, on the basis of the estimation result of battery information management section 280. More specifically, when estimating that the user holds charged charging apparatus 410, battery state determination section 300 determines to drive electronic device 200 in the normal mode when the remaining battery level decreases. On the other hand, when not estimating that the user holds charged charging apparatus 410, battery state determination section 300 determines to drive electronic device 200 in the power saving mode when the remaining battery level decreases.

That is, when battery information management section 280 determines that the user holds charged charging apparatus 410, battery state determination section 300 determines whether to shift the driving mode to the power saving mode. More specifically, battery state determination section 300 determines whether to shift the driving mode to the power saving mode in consideration of the total residual capacity including not only the remaining battery level of battery 250 but also the stored amount of power of charging apparatus 410. In Embodiment 1, it is assumed that charging apparatus 410 is fully charged.

Battery state determination section 300 outputs the determination result of whether the driving mode of electronic device 200 is maintained as the normal mode or is shifted to the power saving mode to battery state linkage control section 310.

Battery state determination section 300 compares the remaining battery level with the threshold set in remaining battery level threshold setting section 290 (hereinafter, simply referred to as a "threshold"), and considers a case where the remaining battery level becomes equal to or less than the threshold as the above-described case where the remaining battery level decreases. That is, when the remaining battery level decreases to a level equal to or less than the predetermined battery capacity, battery state determination section 300 determines whether to drive electronic device 200 in the power saving mode, on the basis of the estimation result of battery information management section 280.

Battery state linkage control section 310 controls the driving of electronic device 200 according to the determination result of battery state determination section 300. More specifically, battery state linkage control section 310 determines whether predetermined conditions are satisfied. Then, when determining that the predetermined conditions are satisfied, battery state linkage control section 310 shifts the driving of electronic device 200 (including display control section 220 and communication control section 240) from the normal mode to the power saving mode. The predetermined condition is a condition that electronic device 200 is determined to be driven in the power saving mode when the remaining battery level decreases to a level equal to or less than the predetermined battery capacity and that it is detected that the remaining battery level decreases to a level equal to or less than the predetermined battery capacity.

Electronic device 200 includes, for example, a CPU, a storage medium such as a ROM storing a control program, and a working memory such as a RAM, which are not illustrated. In this case, the function of each component described above is implemented by the CPU executing the control program.

Such electronic device 200 can switch whether or not to drive electronic device 200 in the power saving mode when the remaining power level of the battery decreases to a level equal to or less than the predetermined battery capacity, according to whether the user holds charged charging apparatus 410. Accordingly, when the remaining power level of the battery decreases and when the power of charging apparatus 410 can be used, electronic device 200 can maintain the normal mode. Then, when the remaining power level of the battery decreases and when the power of charging apparatus 410 cannot be used, electronic device 200 can switch from the normal mode to the power saving mode. That is, even when the moving route or velocity of the electronic device is not fixed, electronic device 200 can appropriately determine the necessity of switching to the power saving mode, which makes it possible to improve the convenience of users.

The description of the configuration of electronic device 200 has been given thus far.

Next, operations of electronic device 200 will be described. Before this description, flags used in these operations will be described first.

Electronic device 200 manages information on whether the user holds the charged reserve battery (charging apparatus 410 in the present embodiment), using a flag representing the presence or absence of the reserve battery (hereinafter referred to as a "reserve battery flag"). The value of the reserve battery flag is "0," the reserve battery flag represents that it is estimated that the user does not hold the charged reserve battery. On the other hand, when the value of the reserve battery flag is "1," the reserve battery flag represents that it is estimated that the user holds the charged reserve battery.

FIG. 3 is a drawing for explaining the meaning of the flags used by electronic device 200.

As illustrated in FIG. 3, first state pattern 511 includes the reserve battery flag "0" and the threshold<the remaining battery level (larger than the threshold) and indicates the absence of the charged reserve battery and a high remaining battery level. Therefore, a preferred driving mode in this state pattern is the normal mode.

Second state pattern 512 includes the reserve battery flag "1" and the threshold<the remaining battery level (larger than the threshold) and indicates the presence of the charged reserve battery and a high remaining battery level. Therefore, a preferred driving mode in this state pattern is the normal mode.

Third state pattern 513 includes the reserve battery flag "0" and the threshold≤the remaining battery level (equal to or less than the threshold) and indicates the absence of the charged reserve battery and a low remaining battery level. In this case, while the remaining battery level decreases and approaches zero, additional power is unlikely acquired. Therefore, the preferred driving mode in this state pattern is the power saving mode.

On the other hand, fourth state pattern 514 includes the reserve battery flag "1" and the threshold≤the remaining battery level (equal to or less than the threshold) and indicates the presence of the charged reserve battery and a low remaining battery level. In this case, although the remaining battery level decreases and approaches zero, additional power is likely acquired by connection to charging apparatus 410 by the user. Application of the power saving mode in this case causes unnecessary functional limitation and thus deteriorate the convenience of the user. Therefore, the preferred driving mode in this state pattern is the normal mode.

The preferred driving mode in this case is a driving mode that operates under the assumption that charging apparatus 410 is charged and the reserve battery stores sufficient power. As illustrated in the flow chart described below, when charging apparatus 410 is not charged and when the reserve battery stores sufficient power does not store sufficient power, the preferred driving mode becomes the power saving mode.

Battery information management section 280 manages the flags and sets their values on the basis of the detection result of the remaining battery level and determination of whether battery 250 is charged outdoors. Battery state determination section 300 can also refer to the values of the flags managed by battery information management section 280.

Electronic device 200 uses a flag indicating the presence or absence of a need to warn the user of for the remaining battery level (hereinafter referred to as a "battery residue warning flag"), and issues the warning. The battery residue warning flag is a flag set to "1" when a warning message is displayed which prompts charging by charging apparatus 410 or the system power supply to the user in the case of a low remaining battery level.

Figure 4:
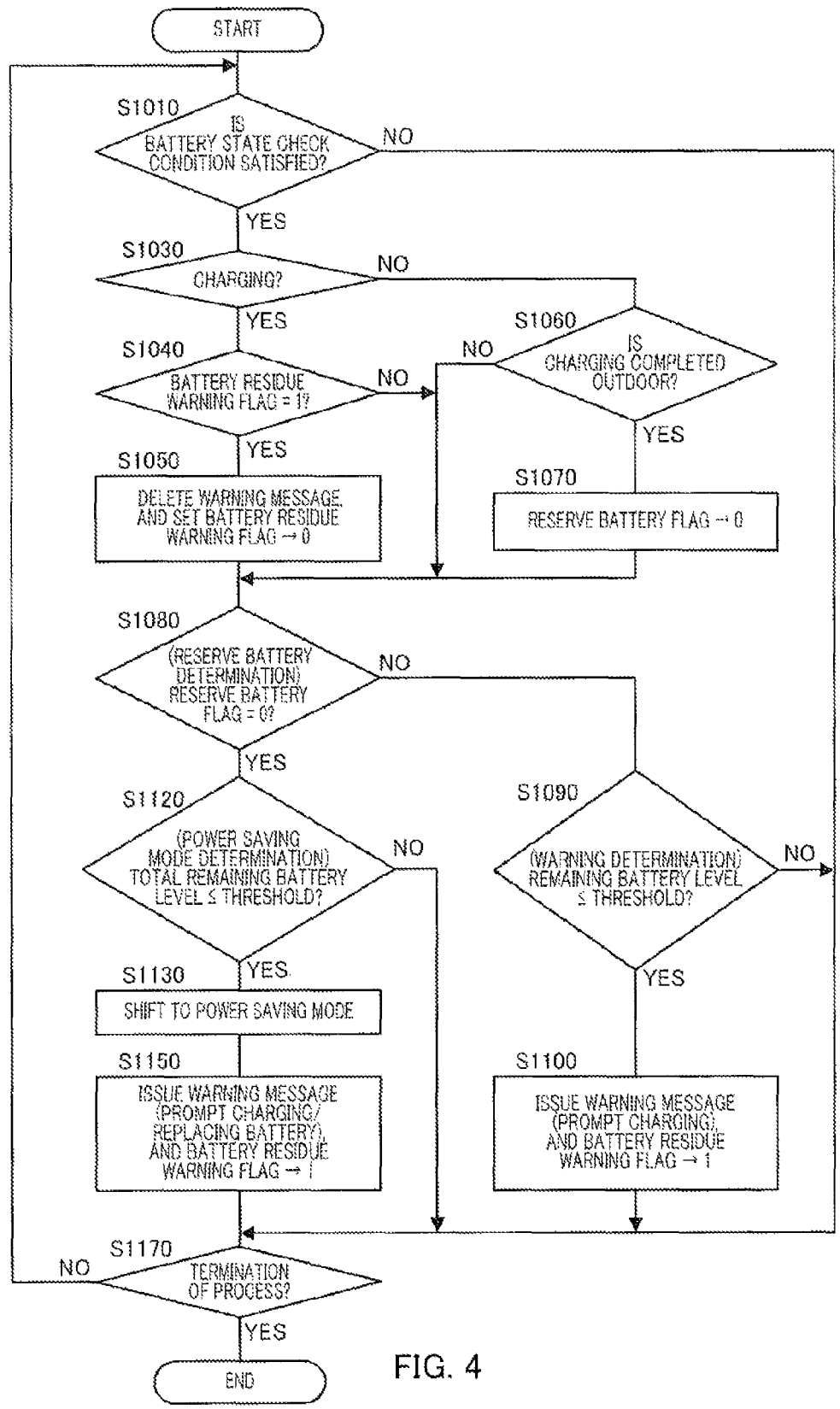
FIG. 4 is a flow chart illustrating an example of operations of the electronic device according to Embodiment 2 of the present invention.

FIG. 4 is a flow chart illustrating an example of operations of electronic device 200.

In this chart, an assumption is made that electronic device 200 has already completed the estimation, at the start point, of whether the user holds charged charging apparatus 410, on the basis of the daily usage of electronic device 200. More specifically, battery information management section 280 detects that a condition that electronic device 200 is being charged and is located outdoors is satisfied. This condition represents that charging is performed outdoors, where it is difficult to connect to a system power supply, and that it is likely that the user holds charged charging apparatus 410. Whether the charging is performed can be determined on the basis of whether the remaining battery level increases, or the connection state of the IF such as Micro USB with charging apparatuses 410.

It is assumed that charging apparatus 410 held by the user is fully charged at the start point, that battery 250 has a large remaining amount i.e., the reserve battery flag is equal to 1, and that the driving mode of electronic device 200 is the normal mode.

In Step S1010, battery state determination section 300 determines whether to satisfy a predetermined condition (battery state check condition) for performing a determination about the remaining battery level. This condition is, for example, the start timing of electronic device 200 or the arrival of predetermined periodical timings. Battery state determination section 300 proceeds to Step S1170 described below if the predetermined condition is not satisfied (S1010: NO). On the other hand, battery state determination section 300 proceeds to Step S1030 if the predetermined condition is satisfied (S1010: YES).

In Step S1030, battery information management section 280 determines whether to satisfy a condition that the charging is being performed. Battery information management section 280 proceeds to Step S1040 when this condition is satisfied (S1030: YES). Battery information management section 280 proceeds to Step S1060 described below when the condition is not satisfied (S1030: NO).

In Step S1040, battery information management section 280 determines whether the battery residue warning flag is set to "1." Battery information management section 280 proceeds to Step S1050 when the battery residue warning flag is set to "1" (S1040: YES). On the other hand, battery information management section 280 proceeds to Step S1080 described below when the battery residue warning flag is not set to "1" (S1040: NO).

In Step S1050, battery information management section 280 deletes the warning message displayed on display section 210 in Steps S1100 and S1150 described below, sets the battery residue warning flag to "0," and proceeds to Step S1080 described below.

In Step S1060, battery information management section 280 determines whether to satisfy a condition that outdoor charging is completed. This determination is made in order to determine whether charging apparatus 410 is spent, i.e., whether the reserve battery flag should be set to "0." Battery information management section 280 proceeds to Step S1070 when this condition is satisfied (S1060: YES). On the other hand, battery information management section 280 proceeds to Step S1080 described below when the condition is not satisfied (S1060: NO).

In Step S1070, battery information management section 280 sets the reserve battery flag to "0."

Then, in Step S1080, battery state determination section 300 performs a reserve battery determination. That is, battery state determination section 300 determines whether the reserve battery flag has a value of "0." That is, this determination is to determine whether the state of electronic device 200 can be determined to be first state pattern 511 or third state pattern 513 explained in FIG. 3. Battery state determination section 300 proceeds to Step S1090 when the reserve battery flag has a value of "1" (S1080: NO). On the other hand, battery state determination section 300 proceeds to Step S1120 described below when the reserve battery flag has a value of "0" (S1080: YES).

That is, electronic device 200 checks whether the process of Step S1080 estimates that the user holds charged charging apparatus 410.

In Step S1090, battery state determination section 300 performs a warning determination. That is, battery state determination section 300 determines whether or not the remaining battery level (the remaining amount of power of battery 250) is equal to or less than the threshold. Battery state determination section 300 proceeds to Step S1170 described below when the remaining battery level is not equal to or less than the threshold. (S1090: NO). On the other hand, battery state determination section 300 proceeds to Step S1100 when the remaining battery level is equal to or less than threshold (S1090: YES).

In Step S1100, for example, battery state determination section 300 displays a message on display section 210 and reports to the user that battery 250 has a low remaining amount. That is, while the remaining battery level approaches zero, battery state determination section 300 battery calls attention to charging by the additional reserve battery. Then, battery state determination section 300 sets the battery residue warning flag to "1" and proceeds to Step 1170 described below.

That is, electronic device 200 performs operations in the case of the presence of charged charging apparatus 410 through the processes of Steps S1090 and S1100.

Note that, when the remaining battery level is equal to or less than a second threshold that is smaller than the threshold described above, battery state determination section 300 may switch the driving mode of the electronic device to the power saving mode although the reserve battery can be used. Additionally, when the remaining battery level of battery 250 becomes equal to or less than the threshold described above or the second threshold, for example, it is preferable that battery state determination section 300 should display a message for issuing a warning to the user, using display section 210.

On the other hand, in Step S1120, battery information management section 280 performs a power saving mode determination. That is, battery information management section 280 calculates the total remaining battery level including charging apparatus 410 (i.e., the remaining amount of power of battery 250+the remaining amount of power of charging apparatus 410) and determines whether or not this total remaining battery level is equal to or less than the threshold. That is, this determination is a determination to distinguish between first state pattern 511 and third state pattern 513 explained in FIG. 3 in the state of electronic device 200. Battery information management section 280 proceeds to Step S1170 described below when the total remaining battery level is not equal to or less than the threshold. (S1120: NO). On the other hand, battery state determination section 300 proceeds to Step S1130 when the total remaining battery level is equal to or less than threshold (S1120: YES).

In Step S1130, battery state determination section 300 shifts the driving mode of electronic device 200 to the power saving mode.

Then, in Step S1150, for example, battery state determination section 300 displays a message on display section 210 and prompt the user to charge the battery by a system power supply or the like or to replace battery 250. Battery state determination section 300 also sets the battery residue warning flag to "1."

That is, electronic device 200 performs operations in the case of the absence of charged charging apparatus 410 through the processes of Steps S1120 to S1150.

In Step S1170, battery state determination section 300 determines whether the termination of the process is instructed by a user operation or the like. Battery state determination section 300 returns to Step S1010 when the termination of the process is not instructed (S1170: NO). Battery state determination section 300 terminates a series of the processes if the termination of the process is instructed (S1170: YES).

By the above operations, electronic device 200 can switch whether to drive electronic device 200 in the power saving mode when the remaining power level of the battery decreases, depending on whether the user holds charging apparatus 410. Electronic device 200 can also prompt the user to replace or charge the battery at an appropriate timing. Electronic device 200 can determine switching to the power saving mode in consideration of not only the remaining amount of power of loaded battery 250 but also the remaining amount of power of charging apparatus 410 held by the user.

As described above, electronic device 200 including the drive control apparatus according to the present embodiment switches whether to operate electronic device 200 in the power saving mode when the remaining power level of battery 250 decreases to a level equal to or less than the predetermined battery capacity. More specifically, electronic device 200 including the drive control apparatus according to the present embodiment switches whether to operate electronic device 200 in the power saving mode depending on whether the user holds charged charging apparatus 410 (battery for charging). In this manner, electronic device 200 can maintain the normal mode when the power of charging apparatus 410 can be used, and can switch to the power saving mode when the power of charging apparatus 410 cannot be used. That is, even when the moving route or velocity of the device is not fixed, electronic device 200 can appropriately determine the necessity of switching to the power saving mode, and can improve the convenience of the user.

Additionally, the configuration of electronic device 200 including drive control apparatus 100 according to the present embodiment is not limited to the configuration illustrated in FIG. 2.

Figure 5:
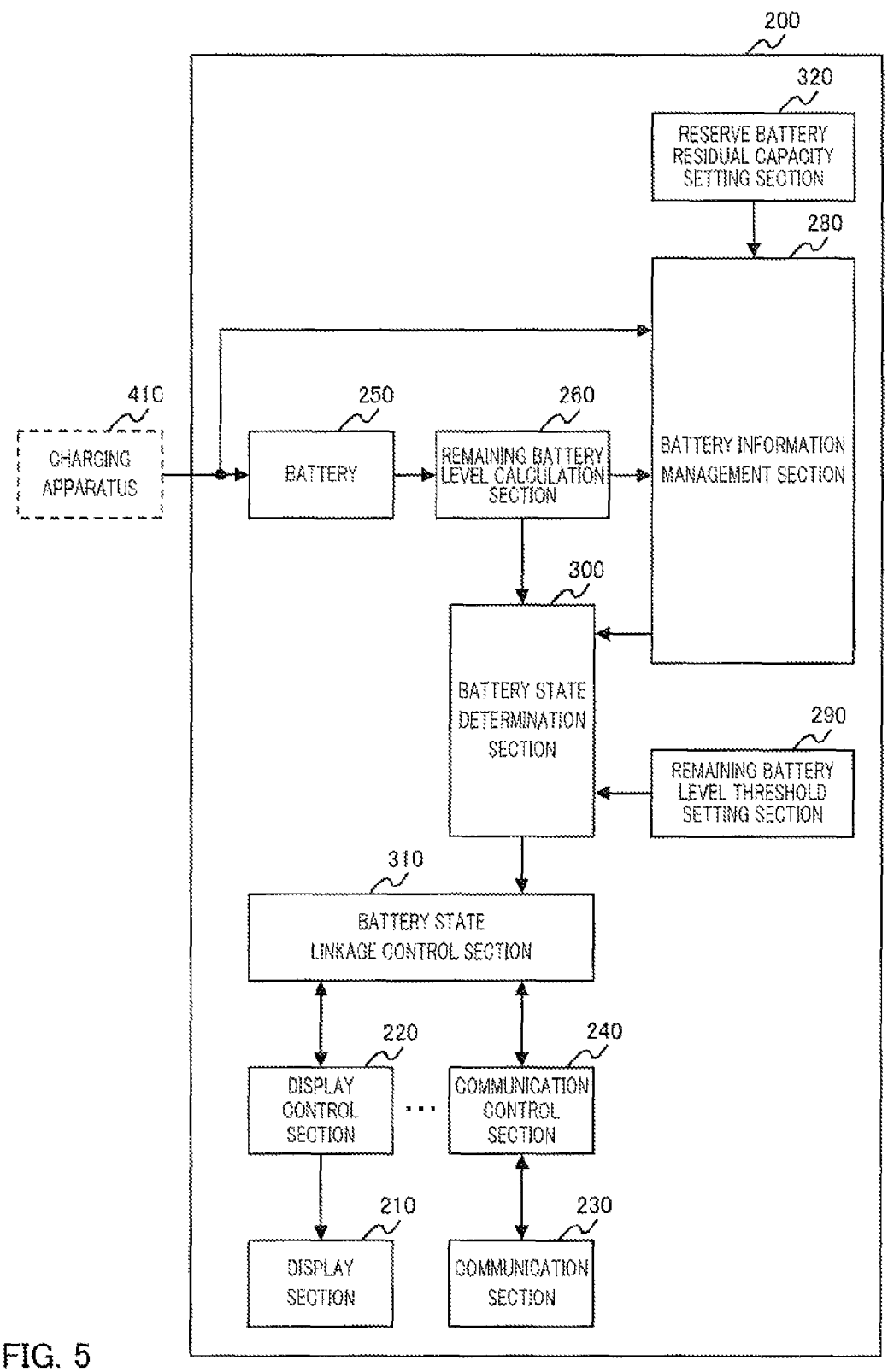
FIG. 5 is a block diagram illustrating a first example of another configuration of the electronic device according to Embodiment 2 of the present invention.

FIG. 5 is a block diagram illustrating a first example of another configuration of electronic device 200 according to the present embodiment, and corresponds to FIG. 2. The same components as those in FIG. 2 are assigned the same reference numerals, and the descriptions thereof will be omitted.

As illustrated in FIG. 5, electronic device 200 may include, for example, reserve battery residual capacity setting section 320. Reserve battery residual capacity setting section 320 is an apparatus section that receives, from the user, setting of the residual capacity of charging apparatus 410 held by the user. In this case, battery information management section 280 acquires information on the remaining power level of the reserve battery from the user input. Thereby, battery information management section 280 can omit the process for detecting the remaining amount of power of loaded charging apparatus 410.

Figure 6:
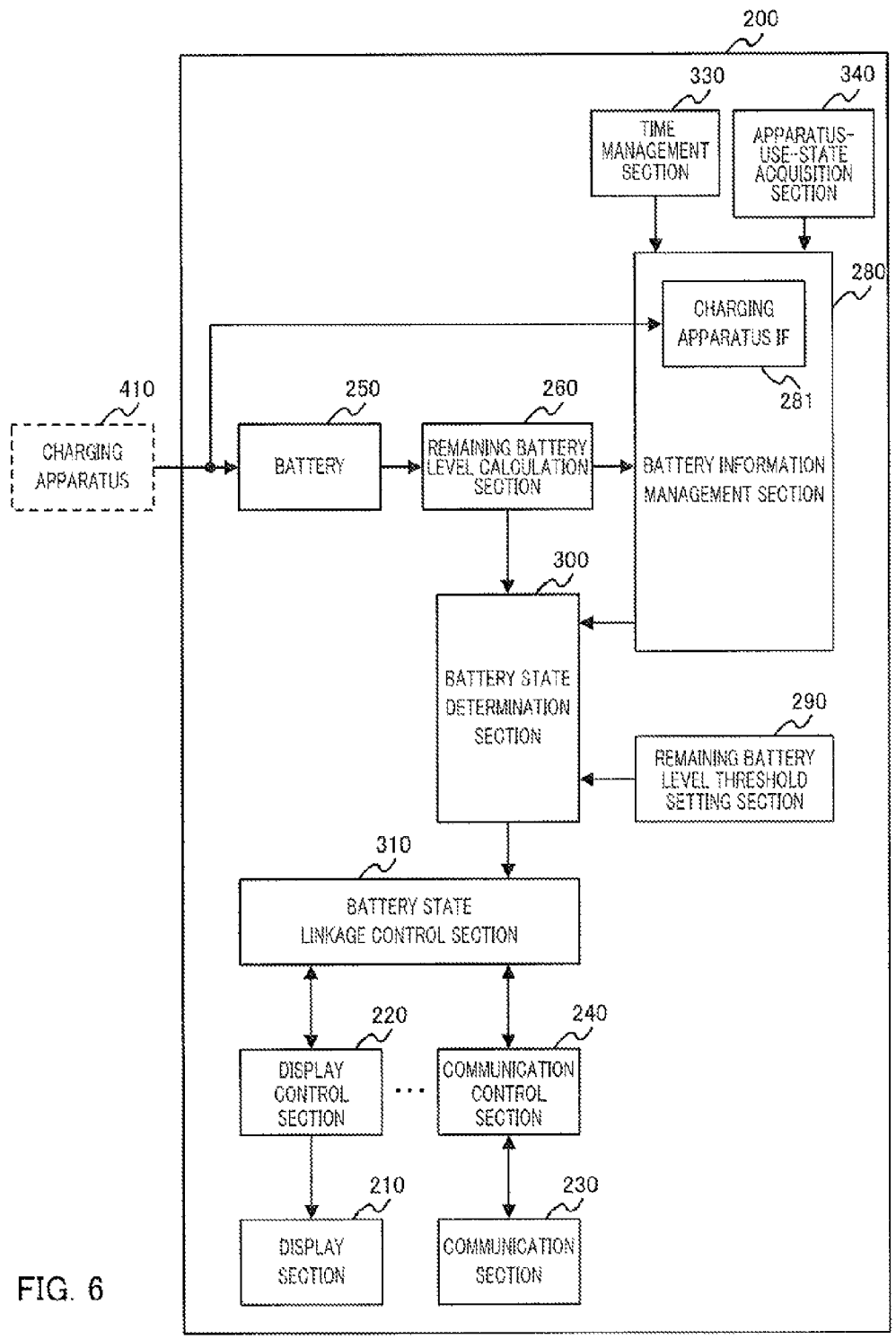
FIG. 6 is a block diagram illustrating a second example of another configuration of the electronic device according to Embodiment 2 of the present invention.

FIG. 6 is a block diagram illustrating a second example of another configuration of electronic device 200 according to the present embodiment, and corresponds to FIG. 2. The same components as those in FIG. 2 are assigned the same reference numerals, and the descriptions thereof will be omitted.

As illustrated in FIG. 6, electronic device 200 may include, for example, time management section 330 and apparatus-use-state acquisition section 340. Time management section 330 is an apparatus that generates and outputs time information obtained by time measurement. Apparatus-use-state acquisition section 340 is an apparatus section that generates and outputs execution application information representing an application executed by electronic device 200. In this case, battery information management section 280 calculates, for example, the difference between the power consumption for every application not during the charging and the power consumption for the execution time of the application utilized during the charging. Then, battery information management section 280 determines the power amount charged from charging apparatus 410 based on the calculated difference.

Figure 7:
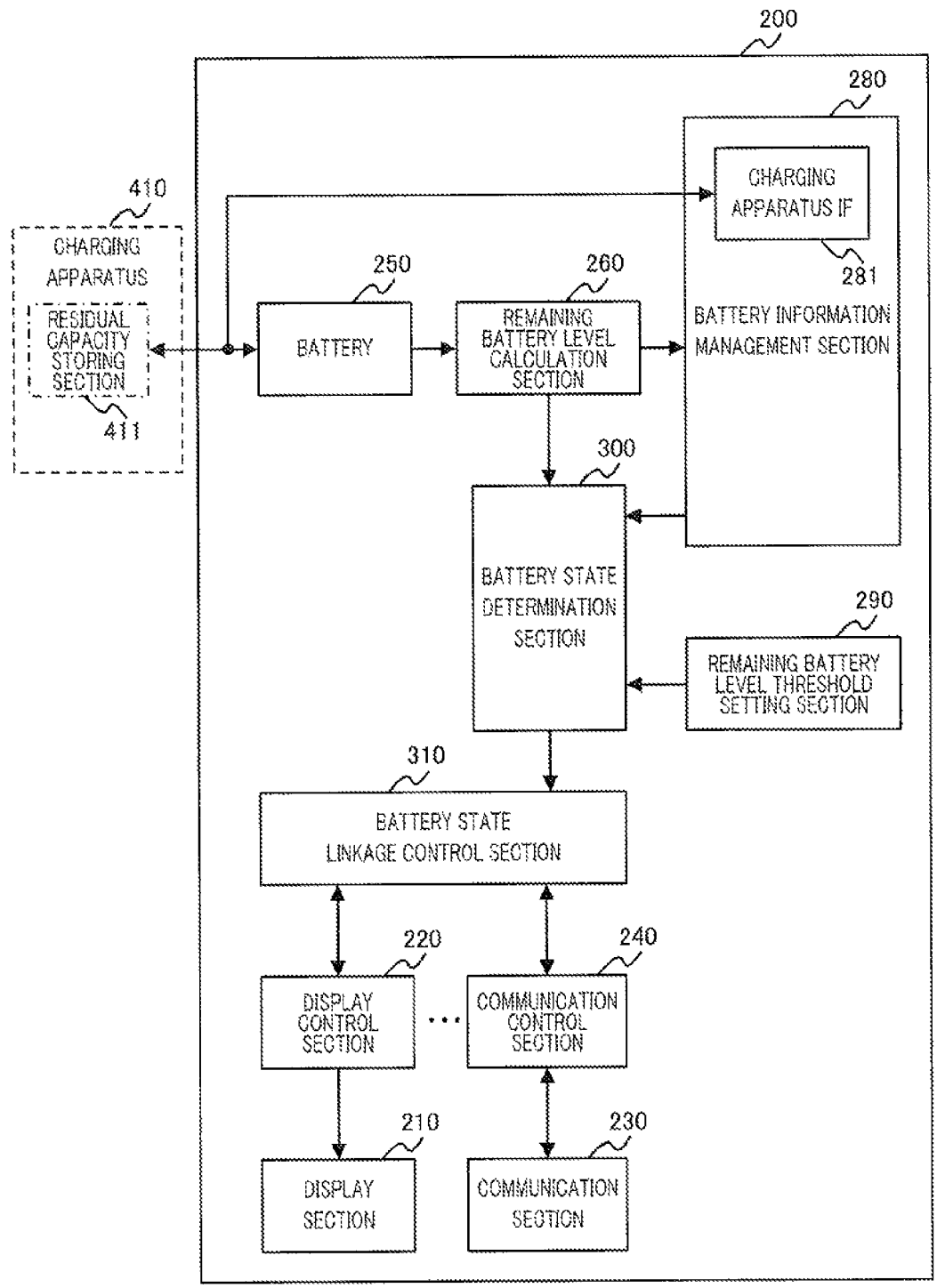
FIG. 7 is a block diagram illustrating a third example of another configuration of the electronic device according to Embodiment 2 of the present invention.

FIG. 7 is a block diagram illustrating a third example of another configuration of electronic device 200 according to the present embodiment, and corresponds to FIG. 2. The same components as those in FIG. 2 are assigned the same reference numerals, and the descriptions thereof will be omitted.

As illustrated in FIG. 7, electronic device 200 may be configured to acquire, for example the remaining amount (residual capacity) of power of the reserve battery, which is stored in residual capacity storing section 411, from residual capacity storing section 411 provided in reserve battery (charging apparatus 410). In this case, electronic device 200 acquires the remaining amount of power of the reserve battery connected to electronic device 200, for example, through charging apparatus interface 281. In this case, battery information management section 280 acquires information on the remaining power level of the reserve battery directly from the reserve battery. Thus, battery information management section 280 can omit the process for calculating the remaining amount of power of charging apparatus 410.

Additionally, it is preferable that the determination or acquisition of the remaining amount of power of the reserve battery should be performed at the determination timing for the total remaining battery level described above.

Electronic device 200 may also cause battery information management section 280 to detect the power amount charged from charging apparatus 410 and may calculate the remaining amount of power of charging apparatus 410 on the basis of the difference between the detected power amount and the initial stored amount of power of charging apparatus 410. The initial stored amount of power of the reserve battery is preset by, for example, the user.

Electronic device 200 may be configured to cause reserve battery residual capacity setting section 320 to receive, from the user, setting of the presence or absence of charged charging apparatus 410.

When the capacity of charging apparatus 410 is larger than the capacity of the battery loaded in electronic device 200, the battery loaded in electronic device 200 can fully be charged a plurality of times. When such charging apparatus 410 is connected to electronic device 200, battery information management section 280 may acquire information representing how many times the battery loaded in electronic device 200 can be charged fully, as information on the remaining power level of the reserve battery. Battery information management section 280 may also calculate how many times the battery can fully be charged on the basis of the remaining amount of power of charging apparatus 410 and the capacity of the battery loaded in electronic device 200.

In this case, battery information management section 280 may set the battery residue warning flag to "1" when the battery cannot fully be charged once more. That is, battery information management section 280 may determine to output a message that prompts the user to charge the charging battery, on condition that the remaining power level of the managed charging battery becomes equal to or less than a remaining power level necessary for one time of full charging, at least.

Electronic device 200 may be configured to cause battery information management section 280 to estimate that the reserve battery is also charged fully when battery 250 is fully charged by the system power supply without charging apparatus 410 being loaded. That is, when battery 250 loaded in electronic device 200 is charged with a system power supply in a house or the like, charging apparatus 410 may be estimated to be also charged simultaneously. In such a case, electronic device 200 may also cause battery information management section 280 to set the value of the reserve battery flag to "1," assuming that the charged reserve battery is secured.

In the present embodiment, an example is described in which the additional reserve battery is connected to electronic device 200 through the micro USB interface. However, the connection system for the additional reserve battery is not limited to this example. The additional reserve battery includes a charging battery connected through a wired connection system such as USB, or a non-contact system such as Qi.

The technique for acquiring the information on the remaining amount of power stored in the additional reserve battery is not limited to the user input or USB communication.

Figure 8:
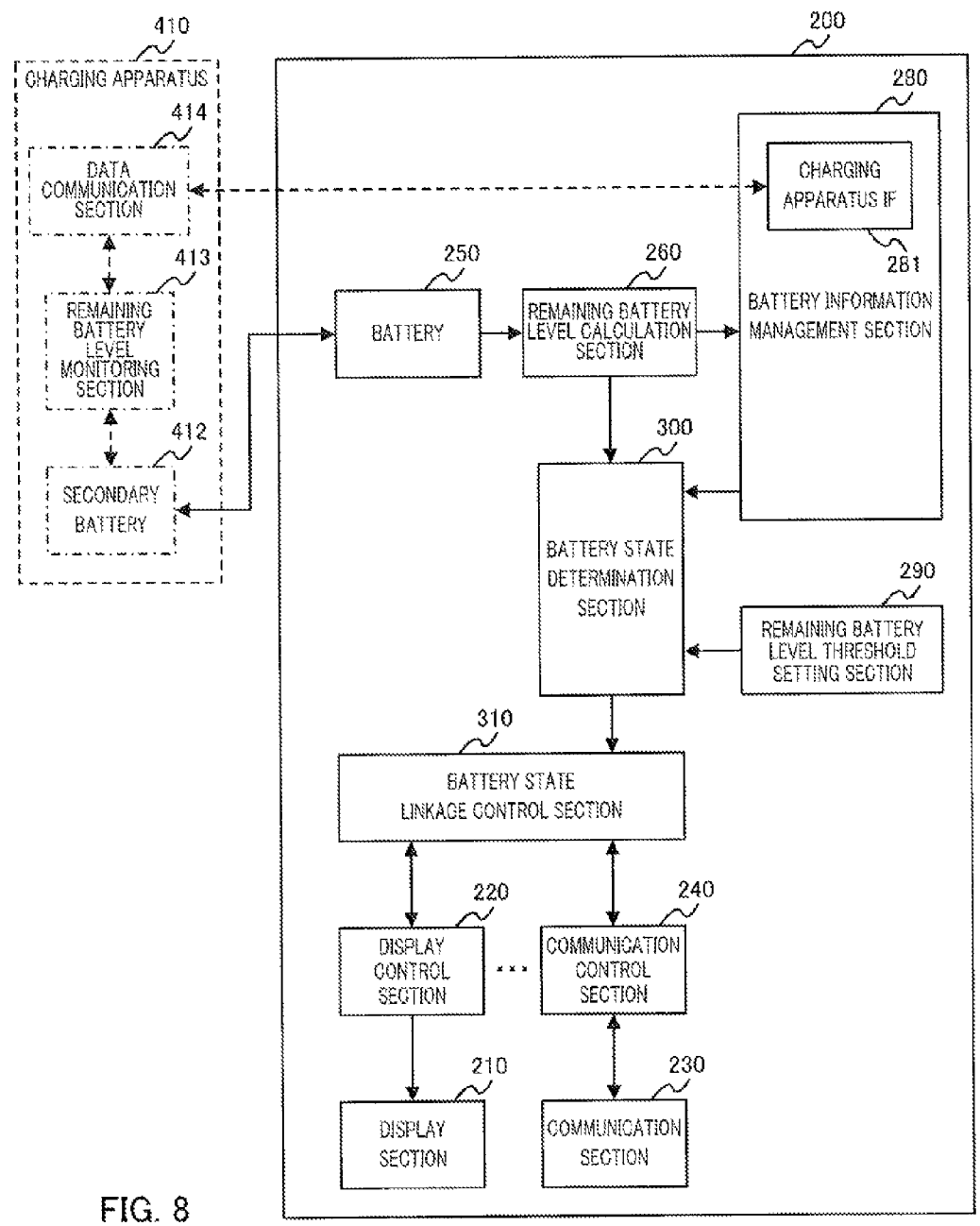
FIG. 8 is a block diagram illustrating a fourth example of another configuration of the electronic device according to Embodiment 2 of the present invention.

FIG. 8 is a block diagram illustrating a fourth example of another configuration of electronic device 200 according to the present embodiment, and corresponds to FIG. 2. The same components as those in FIG. 2 are assigned the same reference numerals, and the descriptions thereof will be omitted.

As illustrated in FIG. 8, the additional reserve battery (charging apparatus 410) includes, for example, secondary battery 412, remaining battery level monitoring section 413 and data communication section 414. Secondary battery 412 stores power. Remaining battery level monitoring section 413 monitors the remaining amount of power stored in secondary battery 412. Data communication section 414 acquires information on the remaining amount of power stored in secondary battery 412, from remaining battery level monitoring section 413. Then, data communication section 414 transmits the acquired information through radio communication such as an IC (Integrated Circuit) tag, and Bluetooth (Registered trademark).

On the other hand, charging apparatus interface 281 of electronic device 200 includes a radio communication antenna (not illustrated) adapted to the IC tag of data communication section 414, and receives the information transmitted from data communication section 414.

In this way, battery information management section 280 may acquire the information on the remaining amount of power stored in the additional reserve battery, through radio communication. Battery information management section 280 may be configured to report the information on the remaining amount of the power, at a timing of pushing a report button provided in charging apparatus 410.

The acquisition source for the information on the remaining amount of power stored the additional reserve battery does not need to be the additional reserve battery itself. For example, when a battery charger for charging the additional reserve battery stores information on the remaining power level of the additional reserve battery, battery information management section 280 may directly acquire this information from the battery charger.

When the information on the remaining power level that is stored in the additional reserve battery cannot directly be acquired from the additional reserve battery or the battery charger, battery information management section 280 may also receive the information input from the user. Alternatively, battery information management section 280 may estimate the remaining amount of power stored in the additional reserve battery, instead of receiving the information input from the user. Accordingly, battery state determination section 300 can more surely make the determination about the power saving mode described above.

Battery information management section 280 may also manage information on the remaining amount of the power for each of a plurality of charging apparatuses 410 on the basis of an ID assigned to each charging apparatus 410.

(Embodiment 3)

The embodiment of the present invention is an example of the determination about a replacement reserve battery.

The configuration of the electronic device including the drive control apparatus according to the present embodiment is the same as that of Embodiment 2, and is therefore not illustrated.

However, in electronic device 200 in the present embodiment, charging apparatus 410 is not additionally connected to battery 250, but is loaded in electronic device 200 instead of battery 250 as a replacement.

Battery information management section 280 also acquires a history of replacement of battery 250, and estimates whether the user holds a replacement reserve battery on the basis of the acquired history.

More specifically, battery information management section 280 monitors whether the remaining battery level varies drastically. Then, when the remaining battery level increases drastically, battery information management section 280 determines that battery 250 is replaced with a charged reserve battery. On the other hand, when the remaining battery level decreases drastically, battery information management section 280 determines that the battery is replaced in order to charge the reserve battery.

That is, battery information management section 280 can determine whether a battery pack currently loaded as battery 250 is a previously used as a default battery or a reserve battery to be used later, on the basis of the transition of the remaining battery level.

Note that, electronic device 200 needs to be surely powered off for battery replacement. Therefore, it is preferable that whether the remaining battery level varies drastically should be determined on the basis of the comparison before and after power-off. In this case, battery information management section 280 needs to store the last value of the remaining battery level detected before power-off and time information indicating the time of detection.

When the information is stored in this way, battery information management section 280 holds the value of the remaining battery level of the removed battery. Therefore, battery information management section 280 can sum the held value of the remaining battery level and the value of the remaining battery level of the battery determined to have been newly loaded, and can thereby calculate the total remaining battery level (corresponding to the total remaining battery level in Embodiment 2) readily.

Figure 9:
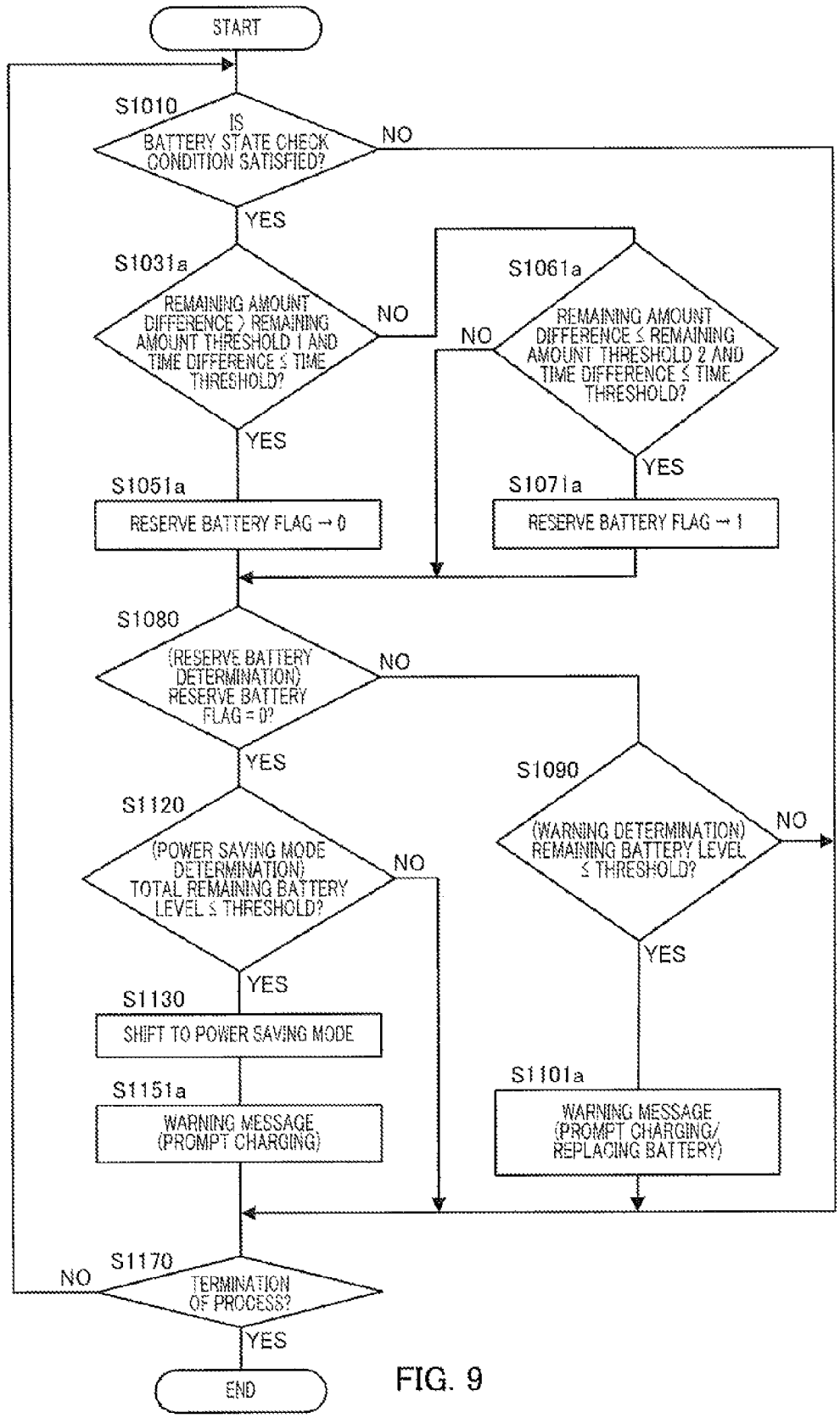
FIG. 9 is a flow chart illustrating an example of operations of the electronic device according to Embodiment 2 of the present invention.

FIG. 9 is a flow chart illustrating an example of operations of electronic device 200 according to the present embodiment, and corresponds to FIG. 4 of Embodiment 2. The same steps as those in FIG. 4 are assigned the same step numbers, and the descriptions thereof will be omitted.

In Step S1031a, battery information management section 280 calculates the difference between the remaining battery level detected this time and the remaining battery level detected last time (hereinafter referred to as "remaining amount difference"). Battery information management section 280 then determines whether to satisfy a condition that the calculated remaining amount difference is larger than predetermined remaining amount threshold 1 and that the difference in the time of the detection between the last time and this time (hereinafter referred to as "time difference") is smaller than a predetermined time threshold. When this condition is not satisfied (S1031a: NO), battery information management section 280 proceeds to Step S1061a. On the other hand, when this condition is satisfied (S1031a: YES), battery information management section 280 proceeds to Step S1051a.

In Step S1051a, battery information management section 280 sets the value of the reserve battery flag to "0."

That is, when the remaining battery level increases rapidly, battery information management section 280 determines that the replacement of battery 250 having a small remaining amount with a charged reserve battery is detected, and sets the value of the reserve battery flag to "0."

In Step S1061a, battery information management section 280 determines whether to satisfy a condition that the remaining amount difference is equal to or less than predetermined remaining amount threshold 2 and that the time difference is smaller than the predetermined time threshold. When this condition is not satisfied (S1061a: NO), battery information management section 280 proceeds to Step S1080a. On the other hand, when this condition is satisfied (S1061a: YES), battery information management section 280 proceeds to Step S1071a.

In Step S1071a, battery information management section 280 sets the value of the reserve battery flag to "1."

That is, when the remaining battery level decreases drastically, battery information management section 280 acquires information indicating the decrease as a use history of the reserve battery. Then, when detecting that the charged battery is removed and replaced with another battery having a small remaining amount, battery information management section 280 estimates that the user holds the charged battery as a reserve battery, and sets the value of the reserve battery flag to "1." When detecting that the loaded battery that is charged fully or almost fully is replaced with another battery having a small remaining amount, battery information management section 280 may recognize that the removed battery is a reserve battery.

Then, in the present embodiment, when the total remaining battery level is equal to or less than the threshold (S1120: YES), the processing shifts to the driving mode to the power saving mode at Step S1130 and then proceeds to Step S1151a.

In Step S1151a, battery state determination section 300 displays a message that calls attention to the charging from the system power supply as a warning message on display section 210.

In Step S1090, when the remaining battery level is equal to or less than the threshold (S1090: YES), the process proceeds to Step 1101a.

In Step S1101a, battery state determination section 300 displays a message that raises caution for replacing with the held reserve battery for replacement, or charging from the system power supply, as a warning message on display section 210.

The warning messages displayed in S1101a and S1151a disappear on display section 210 when electronic device 200 is powered off for the replacement with the replacement reserve battery. Then, after electronic device 200 is powered on to start up after the replacement of the battery, the warning message is not displayed since the remaining battery level is larger than the threshold.

In this way, electronic device 200 according to the present embodiment can acquire the history of replacement of battery 250 loaded in electronic device 200 from the transition of the remaining battery level. Then, electronic device 200 can estimate whether the user holds the reserve battery for replacement and whether the currently loaded battery is a default battery or a reserve battery, on the basis of the acquired history.

Thereby, when a plurality of batteries are replaced for the usage, electronic device 200 can consider the usage sequence after charging and can estimate the remaining amount of power of an unused reserve battery. That is, even when the reserve battery is for replacement, electronic device 200 can appropriately determine the necessity of switching to the power saving mode, and can improve the usability of the user.

Embodiment 2 and Embodiment 3 have been described using an example in which battery information management section 280 holds the estimation result of whether the user holds the reserve battery, as a reserve battery flag, but are not limited to this. For example, the estimation result may be held in the battery state determination section 300 or battery state linkage control section 310.

Battery information management section 280 may also determine whether the charging is performed indoors or outdoors, and may store a predetermined area including a place where indoor charging is performed more frequently as a place where charging from the system power supply is performed. If no user operation continues for a predetermined time period or more in the stored place, battery state determination section 300 may estimate that both the battery and the reserve battery are charged fully, at the time of the next user operation.

Each battery loaded in electronic device 200 may report information representing whether the battery is a reserve battery or a regular (default) battery, to electronic device 200. In this case, electronic device 200 does not need to estimate whether the user holds the reserve battery for replacement, and can make a determination on the basis of the report from the battery to simplify the process.

Alternatively, assuming that the reserve battery stores predetermined power, battery information management section 280 may manage only the presence or absence of the reserve battery. Then, battery state determination section 300 may determine whether to perform the power saving mode, only on the basis of the presence or absence of the reserve battery. In this case, electronic device 200 can determine to shift the driving mode to the power saving mode, taking into account the reserve battery, while reducing the processing load and power consumption.

The disclosure of Japanese Patent Application No. 2011-287710, filed on Dec. 28, 2011, including the specification, drawings and abstract, is incorporated herein by reference in its entirety.

INDUSTRIAL APPLICABILITY

The present invention is useful for a drive control apparatus, a drive control method, and a drive control program that can secure the convenience of users. In particular, the present invention is suitable for various mobile devices such as a smartphone, a tablet terminal, and a mobile game console that are provided with an additional or replacement reserve battery. In addition to the mobile devices, the present invention is also useful in various electronic devices such as a power-assisted bicycle that may be provided with an additional or replacement reserve battery.

REFERENCE SIGNS LIST

100 Drive control apparatus
200 Electronic device
210 Display section
220 Display control section
230 Communication section
240 Communication control section
250 Battery
260 Remaining battery level calculation section
270 Position information acquisition section
280 Battery information management section
281 Charging apparatus interface
290 Remaining battery level threshold setting section
300 Battery state determination section
310 Battery state linkage control section
320 Reserve battery residual capacity setting section
410 Charging apparatus
411 Residual capacity storing section
412 Secondary battery
413 Remaining battery level monitoring section
414 Data communication section

The invention claimed is:

1. A drive control apparatus that controls driving of an electronic device driven by power of a battery, the apparatus comprising:
a battery information management section that manages at least one of a remaining power level of a reserve battery including a charging battery or a replacement battery for the electronic device, and the presence or absence of the reserve battery; and
a battery state determination section that determines whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery, wherein:

the battery information management section acquires the remaining power level of the reserve battery that has been charged and determined to be held by the user; and
the battery state determination section determines to shift the driving of the electronic device from a normal mode to the power saving mode under condition that a total value of the remaining power level of the battery and the remaining power level of the reserve battery is equal to or less than a predetermined threshold.

2. The drive control apparatus according to claim 1, wherein:
the battery information management section estimates whether a user of the electronic device holds the reserve battery that has been charged; and
the battery state determination section determines whether or not to drive the electronic device in the power saving mode when the remaining power level of the battery loaded in the electronic device decreases to a level equal to or less than the predetermined battery capacity, based on an estimation result of whether the user holds the reserve battery that has been charged.

3. The drive control apparatus according to claim 1, further comprising a battery state linkage control section that controls the driving of the electronic device according to a determination result of the battery state determination section.

4. The drive control apparatus according to claim 1, wherein the battery information management section acquires information on the remaining power level of the reserve battery directly from the reserve battery or through user input.

5. The drive control apparatus according to claim 4, wherein, when the charging battery that allows for a plurality of times of full charging of the battery loaded in the electronic device is connected, the battery information management section acquires information indicating how many more times of the full charging is allowed by the charging battery, as information on the remaining power level of the reserve battery.

6. The drive control apparatus according to claim 4, wherein the battery information management section determines to output a message that prompts charging of the charging battery under condition that the remaining power level of the charging battery under management becomes equal to or less than a remaining power level necessary for one time of full charging, at least.

7. The drive control apparatus according to claim 1, wherein the charging battery includes a charging battery to be connected via a wired connection scheme such as USB or a non-contact scheme such as Qi.

8. A drive control method of controlling driving of an electronic device driven by power of a battery, the method comprising:
managing at least one of a remaining power level of a reserve battery including a charging battery or a replacement battery for the electronic device, and the presence or absence of the reserve battery; and
determining whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery, wherein:

the managing acquires the remaining power level of the reserve battery that has been charged and determined to be held by the user; and the determining determines to shift the driving of the electronic device from a normal mode to the power saving mode under condition that a total value of the remaining power level of the battery and the remaining power level of the reserve battery is equal to or less than a predetermined threshold.

9. A drive control program stored on a non-transitory computer readable medium that controls driving of an electronic device driven by power of a battery, the program causing a computer of the electronic device to execute processing comprising:

managing at least one of a remaining power level of a reserve battery including a charging battery or a replacement battery for the electronic device, and the presence or absence of the reserve battery; and determining whether or not to drive the electronic device in a power saving mode when the remaining power level of the battery loaded in the electronic device decreases to a level equal to or less than a predetermined battery capacity, based on at least one of the remaining power level of the reserve battery and the presence or absence of the reserve battery, wherein:

the managing acquires the remaining power level of the reserve battery that has been charged and determined to be held by the user; and the determining determines to shift the driving of the electronic device from a normal mode to the power saving mode under condition that a total value of the remaining power level of the battery and the remaining power level of the reserve battery is equal to or less than a predetermined threshold.

* * * * *